(12) United States Patent
Huang

(10) Patent No.: US 8,104,981 B2
(45) Date of Patent: Jan. 31, 2012

(54) METHOD FOR COMMONLY USING SCANNING/PRINTING PATH OF A MULTIFUNCTION OFFICE MACHINE AND A DEVICE THEREOF

(75) Inventor: Ying-Chieh Huang, Taipei (TW)

(73) Assignee: Kinpo Electronics, Inc., Taipei (TW)

(*) Notice: Subject to any disclaimer, the term of this patent is extended or adjusted under 35 U.S.C. 154(b) by 903 days.

(21) Appl. No.: 12/073,914

(22) Filed: Mar. 12, 2008

(65) Prior Publication Data

US 2009/0196653 A1 Aug. 6, 2009

(30) Foreign Application Priority Data

Jan. 31, 2008 (TW) ................. 97103821 A

(51) Int. Cl.
*B65H 3/44* (2006.01)
*B41J 13/00* (2006.01)
(52) U.S. Cl. .......... 400/629; 400/624; 358/498
(58) Field of Classification Search ........ 271/9.07, 271/9.11; 358/498; 400/624, 629
See application file for complete search history.

(56) References Cited

U.S. PATENT DOCUMENTS

| | | | | |
|---|---|---|---|---|
| 3,756,586 A | * | 9/1973 | Craft | 271/9.07 |
| 4,053,152 A | * | 10/1977 | Matsumoto | 271/9.07 |
| 5,587,812 A | * | 12/1996 | Kasuya | 358/498 |
| 5,727,890 A | | 3/1998 | Stodder et al. | |
| 6,135,438 A | * | 10/2000 | Newman et al. | 271/9.07 |
| 2008/0231920 A1 | * | 9/2008 | Oh | 358/496 |

FOREIGN PATENT DOCUMENTS

| | | | | |
|---|---|---|---|---|
| JP | 55123833 A | * | 9/1980 | |
| JP | 63262351 A | * | 10/1988 | |
| JP | 03284555 A | * | 12/1991 | |
| JP | 04129928 A | * | 4/1992 | |
| JP | 08214110 A | * | 8/1996 | |
| JP | 9193478 A | | 7/1997 | |
| KR | 20030066227 A | | 8/2003 | |
| TW | 559612 | | 11/2003 | |
| TW | 593107 | | 6/2004 | |

* cited by examiner

*Primary Examiner* — Daniel J Colilla
(74) *Attorney, Agent, or Firm* — Bacon & Thomas, PLLC

(57) ABSTRACT

A method for commonly using scanning/printing path of a multifunction office machine and a device thereof. The device has a first and a second feeder slots adjacent to each other, whereby documents to be scanned and sheets to be printed can be respectively placed into the first and second feeder slots. A first restricting member is arranged on one side of the output end of the first feeder slot. A second restricting member is arranged on one side of the output end of the second feeder slot. A common pivotal member is disposed between the first and second restricting members. The common pivotal member is able to selectively drivingly abut against the first or the second restricting member. A power source serves to drive the first and second restricting members or the common pivotal member to respectively transfer the documents and the sheets for scanning and printing.

2 Claims, 5 Drawing Sheets

METHOD FOR COMMONLY USING SCANNING/PRINTING PATH OF A MULTIFUNCTION OFFICE MACHINE AND A DEVICE THEREOF

BACKGROUND OF THE INVENTION

The present invention is related to a method for commonly using scanning/printing path of a multifunction office machine and a device thereof. The device includes a common feeding power source which can be switched in operation direction as necessary for transferring documents to be scanned or sheets to be printed.

A conventional office machine with scanning and printing functions is generally designed with separated printing module and scanning module. The printing module and the scanning module respectively have different sheets/documents packing paths and feeding mechanisms. In fact, the parts of these two modules have the same function. Therefore, duplicate parts are used in the office machine. This leads to higher cost and is not economic. In addition, the volume of the office machine is enlarged so that the product of the office machine can be hardly minified and compacted.

U.S. Pat. No. 5,727,890 discloses a multiple-function printer with common chassis feeder/output path mechanisms and method of operation. The printer has a common sheets/documents feeding mechanism. As shown in FIG. 1 of the above Patent, a common input feeder slot 30 is obliquely arranged in a frame 20. The feeder slot 30 has an opening. A pick roller 32 is positioned beside an inner end (lower end) of the feeder slot 30. A divider 35 is disposed in the feeder slot 30 to divide the internal space thereof into an automatic document feeder ADF 28 and an automatic sheet feeder ASF 26. A pressure plate 34 is arranged on the bottom face of the feeder slot 30. One end of the pressure plate is pivotally connected with one side of the opening, while the other end of the pressure plate is supported on a spring 38. A stripper pad 33 is disposed beside the pick roller 32 to resiliently abut against the same. Further referring to FIGS. 8, 9 and 10 of the above Patent, the spring supports the pressure plate to different extents, whereby the documents in the automatic document feeder and the sheets in the automatic sheet feeder respectively contact with the surface of the stripper pad in different positions. The pick roller respectively drives the documents and the sheets to go between the pick roller and the stripper pad at different times. Accordingly, the printer has a common documents/sheets transferring mechanism. However, in actual operation, the above Patent has some shortcomings as follows:

1. Beside the pick roller, the documents in the automatic document feeder and the sheets in the automatic sheet feeder overlap each other (not totally separated). The pressure plate is supported by the spring to different extents so as to place the documents and sheets in the true feeding position. Then the pick roller serves to drivingly feed the documents or sheets. Accordingly, the precision of the documents/sheets feeding operation is apt to be affected due to different circumferential factors, for example, friction of the surface of the sheets, the wearing of the pick roller, elastic failure, etc.
2. As shown in the figures of the Patent, the documents in the automatic document feeder are positioned between the sheets in the automatic sheet feeder and the pick roller. Therefore, in use, in case that a great amount of documents are fed and scanned, only after all the documents are scanned and sent out, the sheets in the automatic sheet feeder can be fed and printed. Accordingly, the circuit must be inbuilt with a memory of very great capacity for memorizing the contents of the documents. As a result, the cost of the printer is increased so that the competitive ability of the product is lowered.

SUMMARY OF THE INVENTION

It is therefore a primary object of the present invention to provide a device with common scanning/printing path of a multifunction office machine. The scanning module and the printing module of the device are partially integrated and commonly used so as to reduce duplicated parts and lower manufacturing cost. In addition, the structure of the device is simplified to enhance the competitive ability of the product.

It is a further object of the present invention to provide a method for commonly using scanning/printing path of a multifunction office machine. The transfer operation can be more easily selectively switched between documents and sheets and the precision in transfer operation can be ensured.

According to the above objects, the method for commonly using scanning/printing path of a multifunction office machine of the present invention includes steps of: arranging a first feeder slot and a second feeder slot adjacent to each other for respectively accommodating documents and sheets therein; arranging a first restricting member with guiding function on one side of a document output end of the first feeder slot outside the document output end, which side is not adjacent to the second feeder slot and arranging a second restricting member with guiding function on one side of a sheet output end of the second feeder slot outside the sheet output end, which side is not adjacent to the first feeder slot; making a rotatable common pivotal member selectively abut against one of the restricting members, the common pivotal member being pivotally displaceable to selectively cooperate with the first restricting member or the second restricting member to drivingly hold the documents from the first feeder slot or the sheets from the second feeder slot; and using a power source to drive the two restricting members or the common pivotal member, with the common pivotal member abutting against the first restricting member or the second restricting member, the power source being used to drive the two restricting members or drive the common pivotal member so as to transfer and feed the held documents or the held sheets.

The device with common scanning/printing path of a multifunction office machine of the present invention includes: a frame at least having a first feeder slot and a second feeder slot, each of the first and second feeder slots having an opening, the first and second feeder slots being adjacent to each other and arranged side by side for respectively accommodating documents to be scanned and sheets to be printed therein, a first restricting member being arranged on one side of a document output end of the first feeder slot outside the document output end, a second restricting member being arranged on one side of a sheet output end of the second feeder slot outside the sheet output end; and a common pivotal member disposed between the first and second restricting members, the common pivotal member being controllably reciprocally displaceable between a first position and a second position to selectively abut against the first restricting member or the second restricting member so as to hold the documents in the first feeder slot or the sheets in the second feeder slot, a power source being used to rotationally drive the two restricting members or drive the common pivotal member or drive the restricting members as well as the common pivotal member so as to feed the held documents or the held sheets.

The present invention can be best understood through the following description and accompanying drawings wherein:

DETAILED DESCRIPTION OF THE PREFERRED EMBODIMENTS

Figure 1:
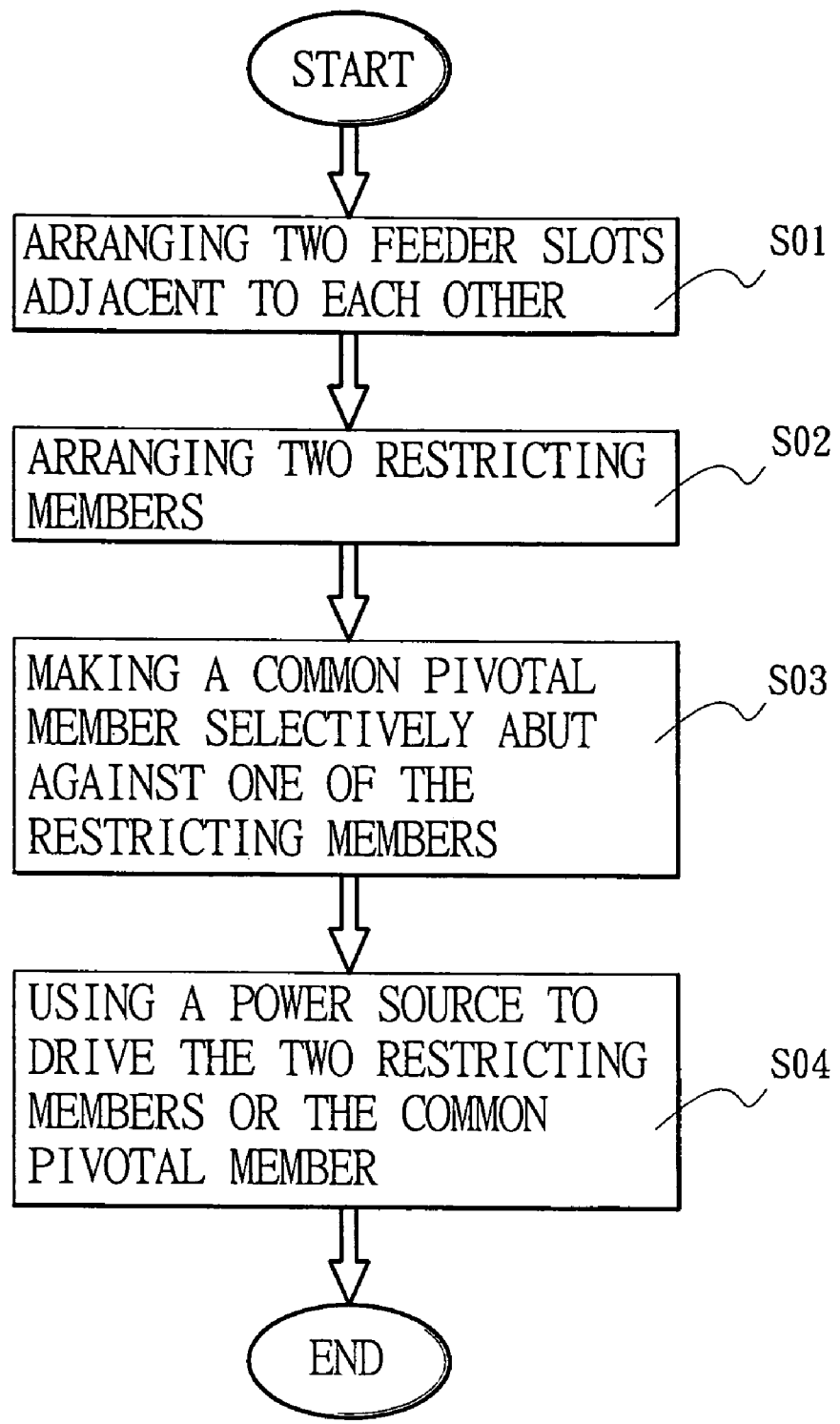
FIG. 1 is a flow chart of the method of the present invention.
Figure 2:
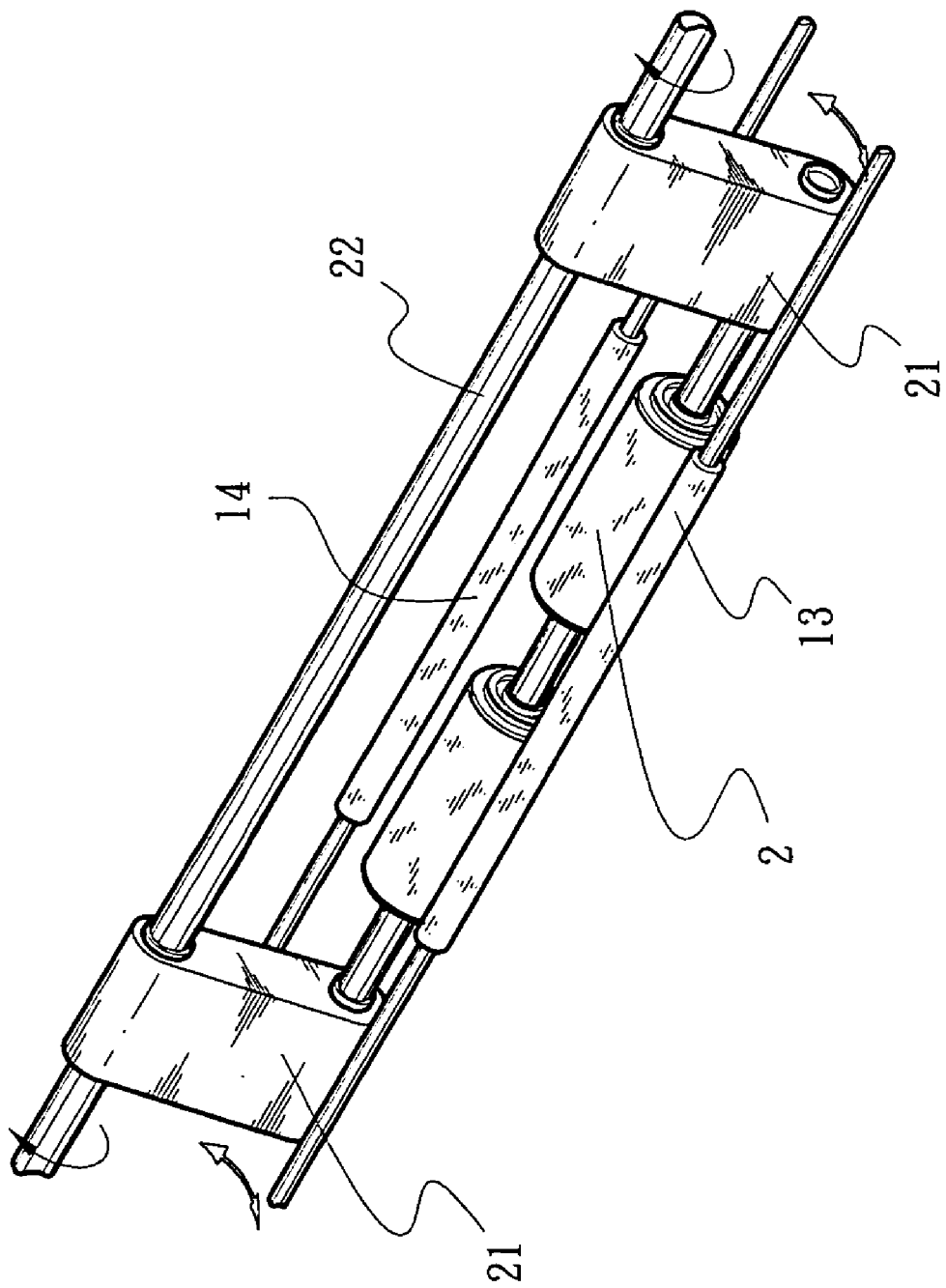
FIG. 2 is a perspective view of the main structure of the present invention.

Please refer to FIG. 1. The method of the present invention includes steps of:

S01. arranging two feeder slots adjacent to each other;
S02. arranging two restricting members;
S03. making a common pivotal member selectively abut against one of the restricting members; and
S04. using a power source to drive the two restricting members or the common pivotal member.

FIGS. 2 to 5 show the structure of the device of the present invention and the operation thereof. First, according to step S01, the device includes a frame 1 having a feeding space 11. The feeding space 11 has an opening. A divider 12 is disposed in the feeding space 11 to divide the feeding space 11 into a first feeder slot 111 and a second feeder slot 112. The first and second feeder slots 111, 112 are adjacent to each other and arranged side by side for respectively accommodating documents 6 to be scanned and sheets 5 to be printed therein. According to step S02, a first restricting member 13 is arranged on one side of a document output end of the first feeder slot 111 outside the document output end, which side is not adjacent to the second feeder slot 112. The first restricting member 13 can be a rotatable roller or any other equivalent member with guiding function. A second restricting member 14 is arranged on one side of a sheet output end of the second feeder slot 112 outside the sheet output end, which side is not adjacent to the first feeder slot 111. The second restricting member 14 can be a rotatable roller or any other equivalent member with guiding function. According to step S03, a common pivotal member 2 (which can be a roller or any other equivalent member with guiding function) is pivotally connected with an end section of at least one rock arm 21. The other end section of the rock arm 21 is pivotally connected between the first and second feed slots 111, 112 via a pivot shaft 22. When the rock arm 21 swings, the common pivotal member 2 selectively drivingly abuts against the first restricting member 13 or the second restricting member 14. Finally, according to step S04, two gears 131, 141 (linking members) are respectively mounted at end sections of the first and second restricting members 13, 14. A power source (not shown) via a gear set (gears 132, 142 engaged with the gears 131, 141) drives the first and second restricting members 13, 14 to rotate in reverse directions. The common pivotal member 2 cooperatively abuts against the first restricting member 13 or the second restricting member 14 to feed the documents 6 in the first feeder slot 111 or the sheets 5 in the second feeder slot 112. A scanner 3 and a printing module 4 are arranged under the feeder slots 111, 112 respectively for scanning the fed documents 6 and the fed sheets 5. Then, the documents 6 or the sheets 5 are conveyed by a main roller 15 and sent out from a common outlet 16 of the frame 1.

Figure 3:
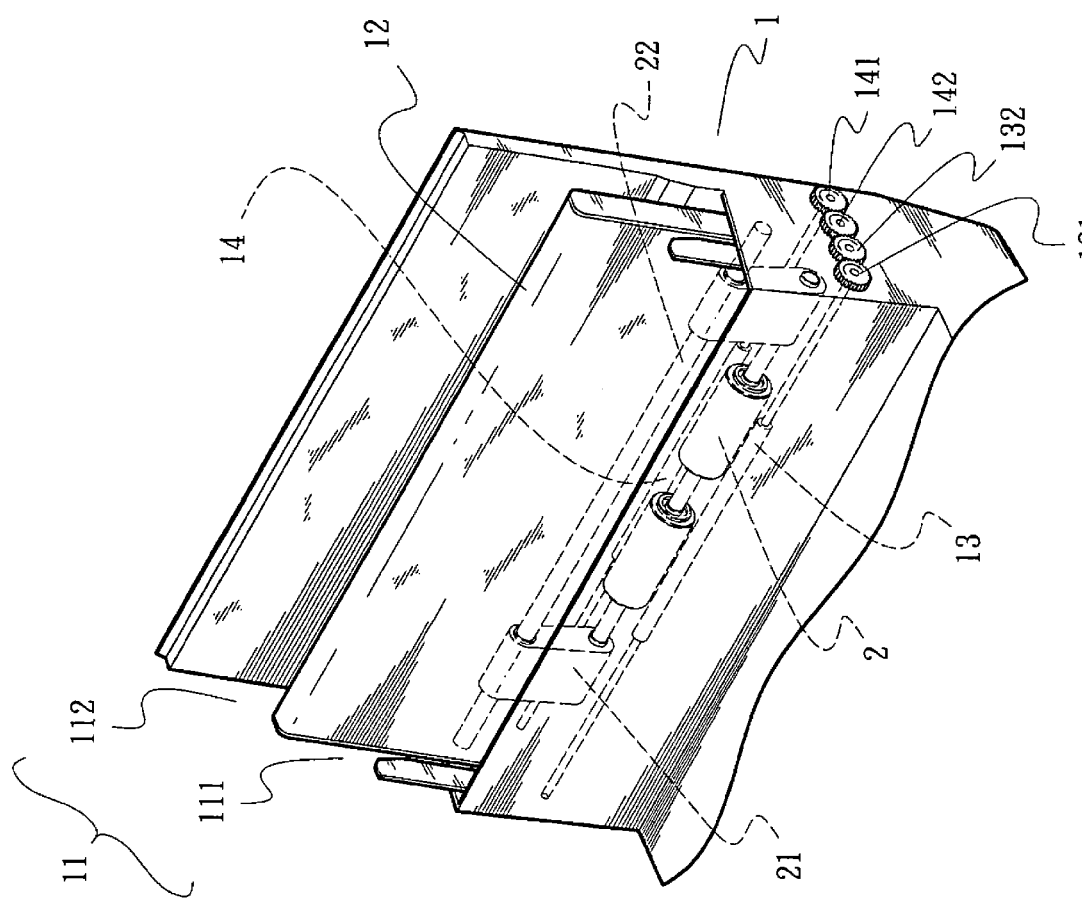
FIG. 3 is a perspective view showing that the structure of FIG. 2 is applied to an office machine.
Figure 4:
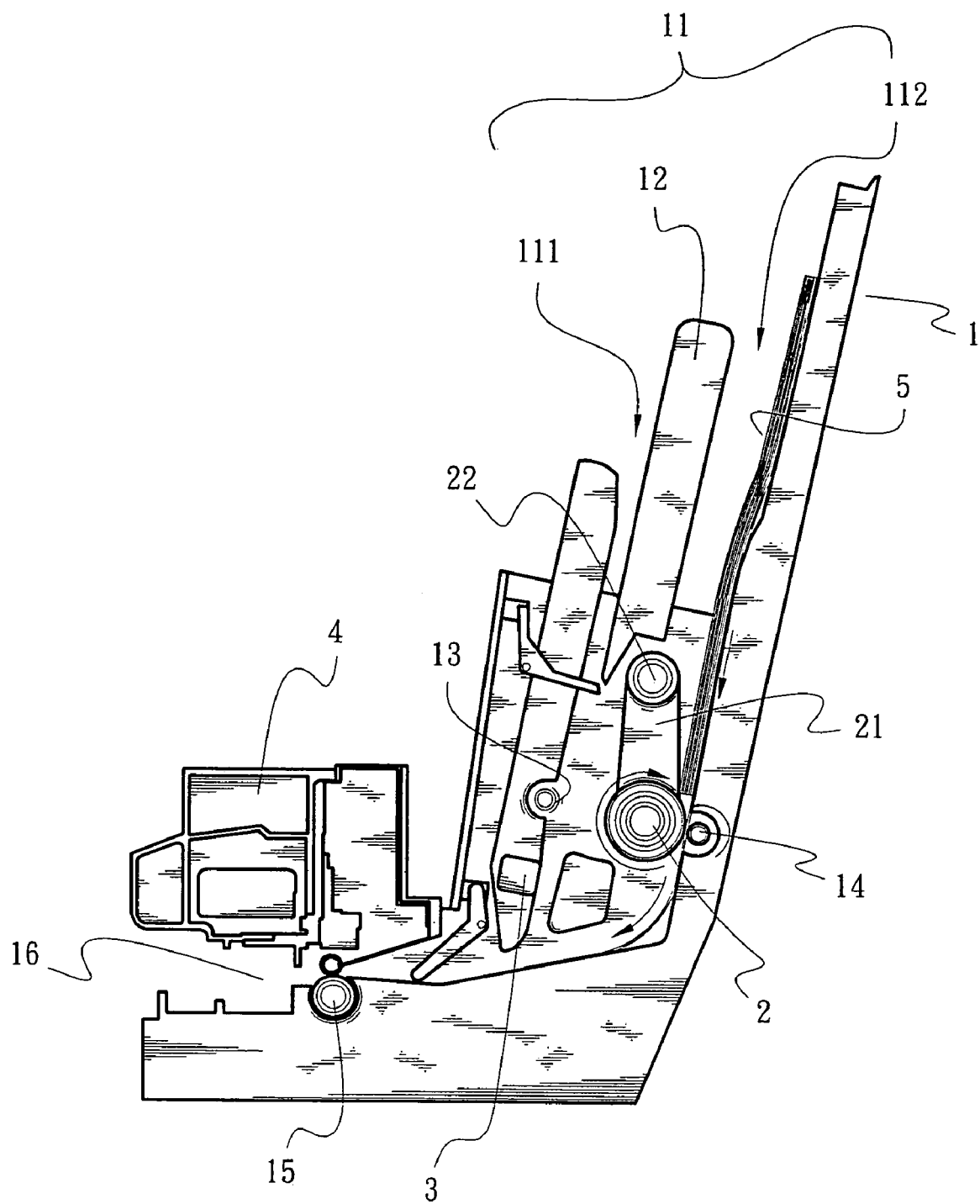
FIG. 4 is a side view according to FIG. 3, showing the operation of the present invention in one state.
Figure 5:
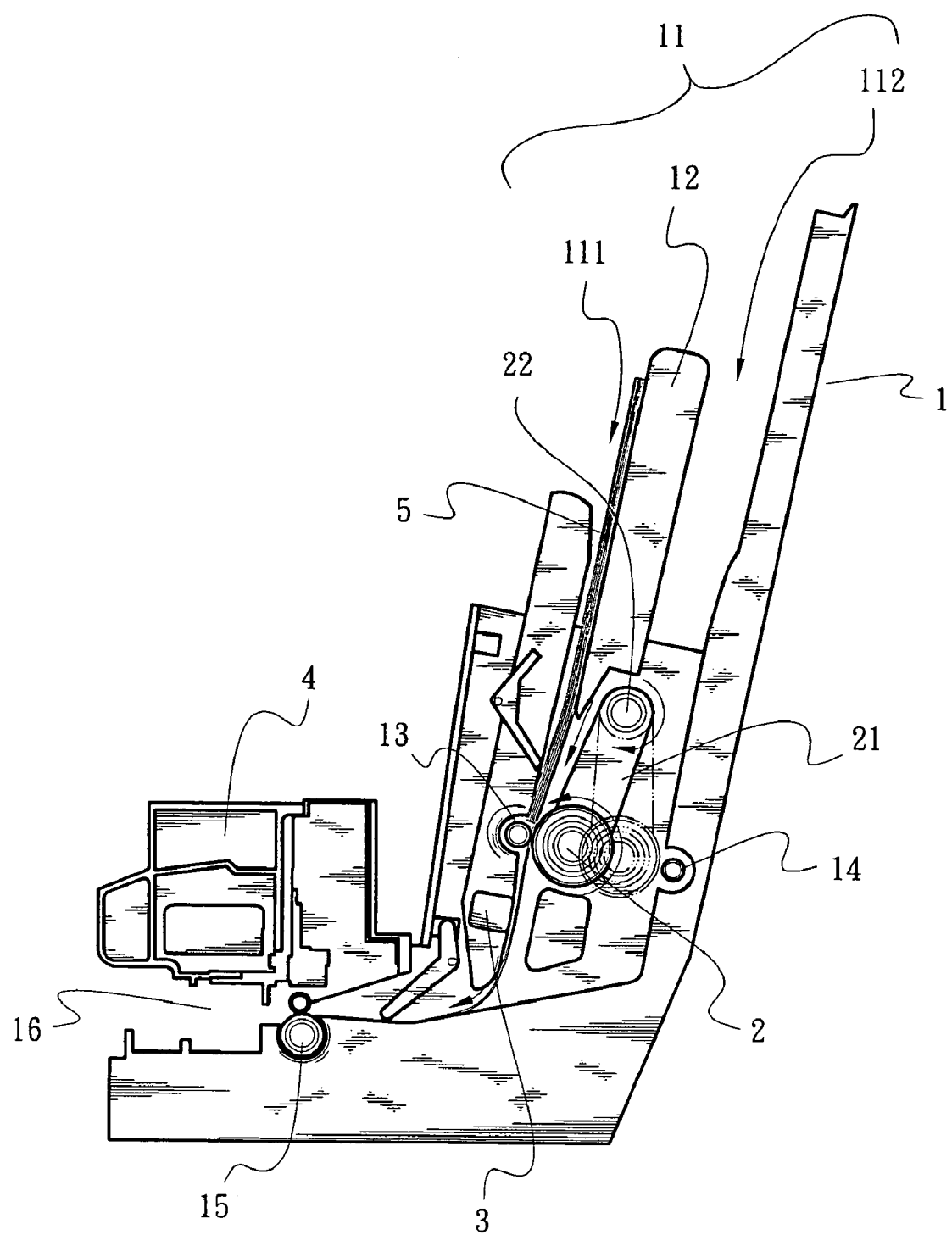
FIG. 5 is a side view according to FIG. 3, showing the operation of the present invention in another state.

As shown in FIG. 3, the gears 132, 142 serve to transmit the power of the power source to rotate the first and second restricting members 13, 14 in reverse directions. The common pivotal member 2 cooperatively idles to hold and transfer the documents 6 or the sheets 5. Alternatively, via a flexible linking member such as a belt or a chain, a power source can be used to drive the common pivotal member 2 to forward or backward rotate. In this case, the first and second restricting members 13, 14 are powerless idlers. Alternatively, the first and second restricting members 13, 14 can be powered to drivingly rotate in a direction in accordance with the rotational direction of the common pivotal member 2. This can achieve the same effect to transfer the documents 6 or the sheets 5 in the same direction.

In conclusion, the present invention provides a method for commonly using scanning/printing path of a multifunction office machine and a device with common scanning/printing path of a multifunction office machine. The device is designed with common parts to simplify the structure and lower the manufacturing cost. In addition, the feeding operation can be more easily selectively switched between the documents and sheets to ensure true feeding operation.

The above embodiments are only used to illustrate the present invention, not intended to limit the scope thereof. Many modifications of the above embodiments can be made without departing from the spirit of the present invention.

What is claimed is:

1. A method for commonly using a scanning/printing path of a multifunction office machine, comprising steps of:
   (1) arranging a first feeder slot and a second feeder slot adjacent to each other for respectively accommodating documents and sheets therein;
   (2) arranging a first restricting member with guiding function on one side of a document output end of the first feeder slot outside the document output end, which side is not adjacent to the second feeder slot and arranging a second restricting member with guiding function on one side of a sheet output end of the second feeder slot outside the sheet output end, which side is not adjacent to the first feeder slot;
   (3) causing a common pivotal member to selectively abut against one of the restricting members, the common pivotal member being pivotally displaceable between the first and second restricting members to selectively abut against the first restricting member or the second restricting member so as to hold the documents from the first feeder slot or the sheets from the second feeder slot; and
   (4) driving the two restricting members, with the common pivotal member abutting against the first restricting member or the second restricting member, wherein the two restricting members are simultaneously driven so as to transfer and feed the held documents or the held sheets upon the selective movement of the common pivotable member,
   wherein the common pivotal member is pivotally connected with an end section of a rock arm, the other end section of the rock arm being arranged to pivot between the first and second restricting members, whereby when the rock arm swings to a first position or a second position, the common pivotal member abuts against the first restricting member or the second restricting member.

2. The method for commonly using a scanning/printing path of the multifunction office machine as claimed in claim 1, wherein when the common pivotal member abuts against the first restricting member or the second restricting member, the common pivotal member is driven to rotate in a forward or backward direction to drivingly feed the documents or the sheets.

* * * * *